United States Patent
Baek et al.

(10) Patent No.: US 10,218,462 B2
(45) Date of Patent: Feb. 26, 2019

(54) APPARATUS AND METHOD FOR SUPPORTING COOPERATIVE TRANSMISSION

(71) Applicant: Electronics and Telecommunications Research Institute, Daejeon (KR)

(72) Inventors: Myung Sun Baek, Daejeon (KR); Sang Woon Kwak, Daejeon (KR); Young Su Kim, Daejeon (KR); Joung Il Yun, Daejeon (KR); Hyoung Soo Lim, Daejeon (KR); Nam Ho Hur, Sejong (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 59 days.

(21) Appl. No.: 15/459,698

(22) Filed: Mar. 15, 2017

(65) Prior Publication Data
US 2017/0346599 A1 Nov. 30, 2017

(30) Foreign Application Priority Data
May 26, 2016 (KR) .................. 10-2016-0064922

(51) Int. Cl.
*H04B 7/08* (2006.01)
*H04L 1/00* (2006.01)
(Continued)

(52) U.S. Cl.
CPC ........ *H04L 1/0061* (2013.01); *G06F 11/1464* (2013.01); *H04B 7/026* (2013.01); *H04B 7/0848* (2013.01); *H04B 7/15592* (2013.01); *H04L 1/06* (2013.01); *G06F 2201/84* (2013.01); *H04L 2001/0097* (2013.01)

(58) Field of Classification Search
CPC . H03M 13/255; H03M 13/09; H03M 13/1102
See application file for complete search history.

(56) References Cited

U.S. PATENT DOCUMENTS

| 2002/0087370 A1* | 7/2002 | Brueckheimer ...... H04L 41/145 |
| | | 370/252 |
| 2007/0002766 A1* | 1/2007 | Park ................... H04B 7/022 |
| | | 370/254 |

(Continued)

FOREIGN PATENT DOCUMENTS

| KR | 10-2007-0004370 A | 1/2007 |
| KR | 10-0886254 B1 | 2/2009 |
| KR | 10-2011-0051479 A | 5/2011 |

*Primary Examiner* — Guy J Lamarre

(57) ABSTRACT

Disclosed is an apparatus and method for supporting cooperative transmission, the apparatus including a controller configured to determine detection bits with respect to a plurality of relay terminals based on channel states between a source terminal and the plurality of relay terminals, the relay terminals configured to detect sub-data corresponding to the detection bits from data when the data is transmitted from the source terminal, an interface configured to receive the sub-data from the relay terminals, respectively, in response to the relay terminals detecting the sub-data, and a restorer configured to restore the data by combining the received sub-data.

16 Claims, 7 Drawing Sheets

(51) Int. Cl.
*H04L 1/06* (2006.01)
*G06F 11/14* (2006.01)
*H04B 7/026* (2017.01)
*H04B 7/155* (2006.01)
*H03M 13/00* (2006.01)

(56) References Cited

U.S. PATENT DOCUMENTS

2009/0313519 A1* 12/2009 Nagaraja ............... H04L 1/0042
 714/751
2011/0273981 A1* 11/2011 Ktenas .................. H04L 1/1825
 370/226
2012/0003940 A1*  1/2012 Hirano .............. H04W 74/0816
 455/67.13
2014/0370802 A1   12/2014 Chang et al.

* cited by examiner

APPARATUS AND METHOD FOR SUPPORTING COOPERATIVE TRANSMISSION

CROSS-REFERENCE TO RELATED APPLICATION(S)

This application claims the priority benefit of Korean Patent Application No. 10-2016-0064922 filed on May 26, 2016, in the Korean Intellectual Property Office, the disclosure of which is incorporated herein by reference for all purposes.

BACKGROUND

1. Field

One or more example embodiments relate to an apparatus and method for supporting cooperative transmission that may receive data transmitted from a source terminal through a plurality of relay terminals.

2. Description of Related Art

A space-time diversity scheme using the existing multiple transmission and reception antennas may increase a stability through performance improvement because an effect of transmission diversity may be achieved by simple operations. However, since a typical communication system structure may not be used as it is and the multiple antennas may need to be used, the cost and hardware complexity for additional antenna installation may increase.

Moreover, if a sufficient space is not ensured between the respective multiple antennas, an orthogonality of space-time code is broken, and a desired performance may not be obtained. Therefore, it is difficult to apply at least two antennas to an actual communication terminal because of constraints of size, cost and complexity of hardware of the communication terminal.

In another example of communication, in a communication system using a cooperative transmission scheme, a relay terminal receives a signal from a source terminal, and transfers the signal to a base station, for example, a destination terminal. In this example, the base station may detect a final signal using the signal transmitted from the source terminal and the signal transmitted from the relay terminal. However, when an error occurs in the signal received by the relay terminal due to a poor channel state between the source terminal and the relay terminal, an error may also occur when the base station detects the final signal. As a result, the signal detected by the base station has a relatively low reliability, and thus the performance of the communication system may decrease significantly.

SUMMARY

An aspect provides technology that may determine detection bits with respect to a plurality of relay terminals based on channel states between a source terminal and the plurality of relay terminals, and restore data by receiving, from the plurality of relay terminals, and combining sub-data corresponding to the detection bits, the sub-data detected from the data in response to the source terminal transmitting the data, thereby stably obtaining high-reliability data through the plurality of relay terminals.

Another aspect also provides technology that may determine an additional bit with a relatively high transmission error rate as a detection bit with respect to a first relay terminal having a relatively satisfactory channel state, determine a basic bit with a relatively low transmission error rate as a detection bit with respect to a second relay terminal having a relatively poor channel state, among a plurality of relay terminals, and transmit the additional bit and the basic bit to the first and second relay terminals such that the first and second relay terminals may stably detect the additional bit and the basic bit in data transmitted from a source terminal, thereby receiving the normal additional bit and basic bit without a transmission error from the first and second relay terminals, without being affected by channel environments.

According to an aspect, there is provided an apparatus for supporting cooperative transmission, the apparatus including a controller configured to determine detection bits with respect to a plurality of relay terminals based on channel states between a source terminal and the plurality of relay terminals, the relay terminals configured to detect sub-data corresponding to the detection bits from data when the data is transmitted from the source terminal, an interface configured to receive the sub-data from the relay terminals, respectively, in response to the relay terminals detecting the sub-data, and a restorer configured to restore the data by combining the received sub-data.

According to another aspect, there is also provided a method of supporting cooperative transmission, the method including determining detection bits with respect to a plurality of relay terminals based on channel states between a source terminal and the plurality of relay terminals, receiving sub-data from the relay terminals, respectively, in response to the individual relay terminals detecting the sub-data corresponding to the detection bits from data when the source terminal transmits the data to each of the plurality of relay terminals, and restoring the data by combining the received sub-data.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
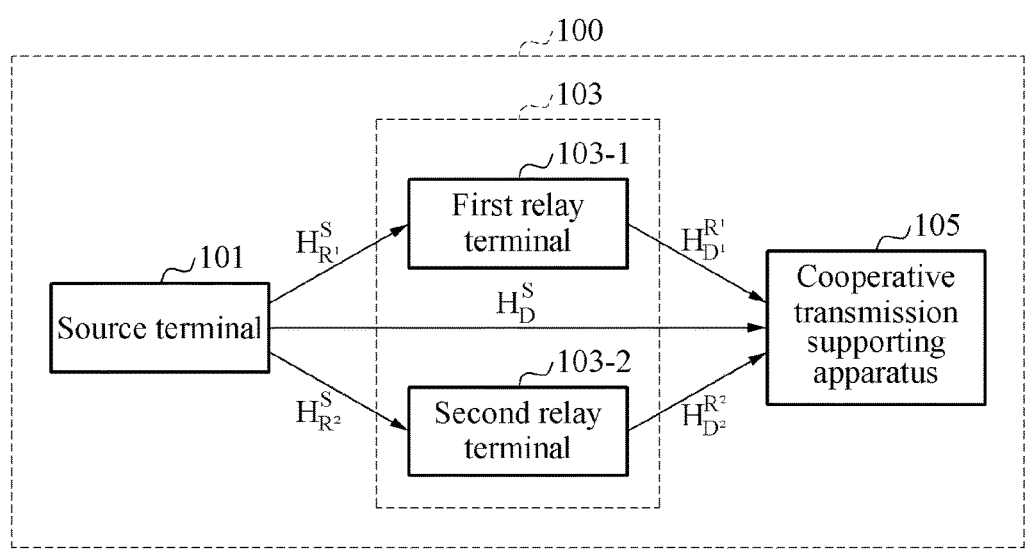
FIG. 1 is a diagram illustrating an example of a network including a cooperative transmission supporting apparatus according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

FIG. 1 is a diagram illustrating an example of a network including a cooperative transmission supporting apparatus according to an example embodiment.

Referring to FIG. 1, a network 100 may include a source terminal 101, a plurality of relay terminals 103, and a cooperative transmission supporting apparatus 105.

The source terminal 101 may check channel states with adjacent terminals, and select a portion of the adjacent terminals as the plurality of relay terminals 103 based on the channel states.

The source terminal 101 may transmit channel states with the selected plurality of relay terminals 103 to the cooperative transmission supporting apparatus 105.

The source terminal 101 may perform synchronization with the plurality of relay terminals 103, and transmit data to the plurality of relay terminals 103 when the synchronization is completed. Further, the source terminal 101 may further transmit the data to the cooperative transmission supporting apparatus 105.

The plurality of relay terminals 103 may be n relay terminals, n being a natural number. For example, the plurality of relay terminals may include a first relay terminal 103-1 and a second relay terminal 103-2. The plurality of relay terminals 103 may each receive the data from the source terminal 101. In this example, the respective data received by the first relay terminal 103-1 and the second relay terminal 103-2 may be expressed by Equation 1.

$$Y_{R_1}^S = H_{R_1}^S X + W_{R_1}^S, \quad Y_{R_2}^S = H_{R_2}^S X + W_{R_2}^S \quad \text{[Equation 1]}$$

In Equation 1, $H_{R_1}^S$ and $H_{R_2}^S$ denote a channel between the source terminal 101 and the first relay terminal 103-1 and a channel between the source terminal 101 and the second relay terminal 103-2, respectively. Further, $W_{R_1}^S$ and $W_{R_2}^S$ denote additive white Gaussian noise (AWGN) of the first relay terminal 103-1 and AWGN of the second relay terminal 103-2, respectively.

The plurality of relay terminals 103 may receive detection bits with respect to the plurality of relay terminals 103 from the cooperative transmission supporting apparatus 105. When the data is received from the synchronized source terminal 101, the plurality of relay terminals 103 may detect sub-data corresponding to the detection bits from the received data, and transmit the detected sub-data to the cooperative transmission supporting apparatus 105. For example, the first relay terminal 103-1 may receive a detection bit with respect to the first relay terminal 103-1 from the cooperative transmission supporting apparatus 105, detect sub-data corresponding to the detection bit from the data received from the source terminal 101, and transmit the detected sub-data to the cooperative transmission supporting apparatus 105. The second relay terminal 103-2 may receive a detection bit with respect to the second relay terminal 103-2 from the cooperative transmission supporting apparatus 105, detect sub-data corresponding to the detection bit from the data received from the source terminal 101, and transmit the detected sub-data to the cooperative transmission supporting apparatus 105.

The cooperative transmission supporting apparatus 105 may be, for example, a base station or a destination terminal. The cooperative transmission supporting apparatus 105 may determine the detection bits with respect to the plurality of relay terminals 103 based on channel states between the source terminal 101 and the plurality of relay terminals 103, and transmit the determined detection bits to the plurality of relay terminals 103, respectively.

The cooperative transmission supporting apparatus 105 may receive the sub-data from the plurality of relay terminals 103, respectively, in response to the plurality of relay terminals 103 detecting the sub-data, and restore the data by combining the sub-data. For example, the cooperative transmission supporting apparatus 105 may receive the sub-data detected by the first relay terminal 103-1 from the first relay terminal 103-1, and receive the sub-data detected by the second relay terminal 103-2 from the second relay terminal 103-2. Here, the sub-data received from the first relay terminal 103-1 and the second relay terminal 103-2 may be expressed by Equation 2.

$$Y = H_D^R X + W_D^R = \begin{bmatrix} H_{D_1}^{R_1} & H_{D_1}^{R_2} \\ H_{D_2}^{R_1} & H_{D_2}^{R_2} \end{bmatrix} \cdot \begin{bmatrix} X^{R_1} \\ X^{R_2} \end{bmatrix} + \begin{bmatrix} W_{D_1} \\ W_{D_2} \end{bmatrix} \quad \text{[Equation 2]}$$

In Equation 2, $H_{D_j}^{R_i}$ denotes a channel between an i-th relay terminal and a j-th antenna of the cooperative transmission supporting apparatus 105. $X^{R_i}$ denotes a signal transmitted from the i-th relay terminal, $W_{D_j}$ denotes an AWGN channel applied to the j-th antenna of the cooperative transmission supporting apparatus 105.

The cooperative transmission supporting apparatus 105 may further receive the data from the source terminal 101. Here, the data received from the source terminal 101 may be expressed by Equation 3.

$$Y = H_D^S X + W_D^S = \begin{bmatrix} H_{D_1}^S \\ H_{D_2}^S \end{bmatrix} \cdot X(k) + \begin{bmatrix} W_{D_1}^S \\ W_{D_2}^S \end{bmatrix} \quad \text{[Equation 3]}$$

In Equation 3, $H_{D_j}^S$ denotes a channel between the source terminal 101 and the j-th antenna of the cooperative transmission supporting apparatus 105, and $W_{D_j}$ denotes AWGN channel of the j-th antenna of the cooperative transmission supporting apparatus 105.

The cooperative transmission supporting apparatus 105 may obtain the initial data transmitted from the source terminal 101 based on the data received directly from the source terminal 101, and the data received from the source terminal 101 through the plurality of relay terminals 103, for example, the data restored from the sub-data.

Figure 2:
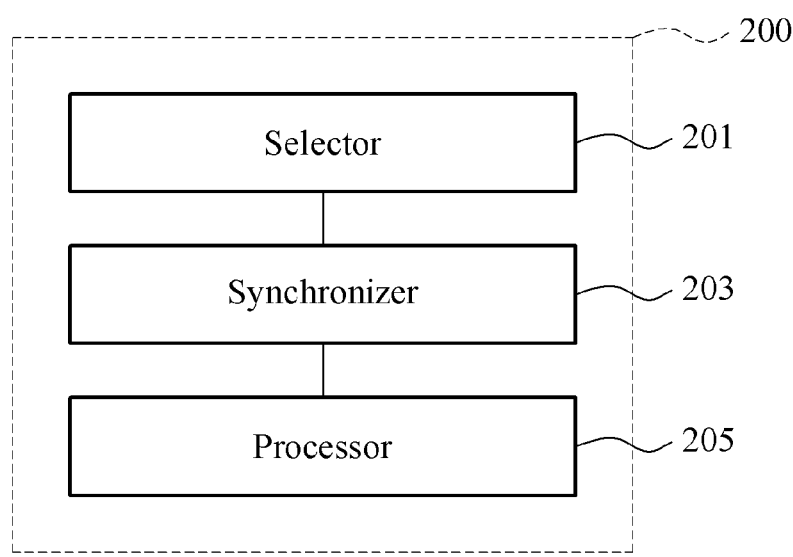
FIG. 2 is a block diagram illustrating a configuration of a source terminal communicating with a cooperative transmission supporting apparatus according to an example embodiment.

FIG. 2 is a block diagram illustrating a configuration of a source terminal communicating with a cooperative transmission supporting apparatus according to an example embodiment.

Referring to FIG. 2, a source terminal 200 may include a selector 201, a synchronizer 203, and a processor 205.

The selector 201 may check channel states with adjacent terminals, and select a portion of the adjacent terminals as a plurality of relay terminals based on the channel states. For example, the selector 201 may check the channel state with the adjacent terminals through channel estimation or signal-to-noise ratio (SNR) estimation, and select two terminals with most satisfactory channel states from the adjacent terminals as the plurality of relay terminals.

Further, the selector 201 may transmit the channel states with the plurality of relay terminals to a cooperative transmission supporting apparatus, along with information related to the selected plurality of relay terminals.

The synchronizer 203 may perform synchronization with each of the plurality of relay terminals.

The processor 205 may hierarchically modulate data and transmit the modulated data to each of the plurality of relay terminals. The processor 205 may further transmit the data to the cooperative transmission supporting apparatus.

When transmitting the data, the processor 205 may transmit the hierarchically modulated data to the plurality of relay terminals or the cooperative transmission supporting apparatus if a cooperative transmission condition is satisfied, for example, in a case in which a relay instruction transmitted from the cooperative transmission supporting apparatus is transmitted to each of the plurality of relay terminals, the plurality of relay terminals are prepared for relay, and the source terminal is synchronized with the plurality of relay terminals. In this example, the data may be transmitted using signals of the same power in all directions, for example, through an isotropic antenna.

Figure 3:
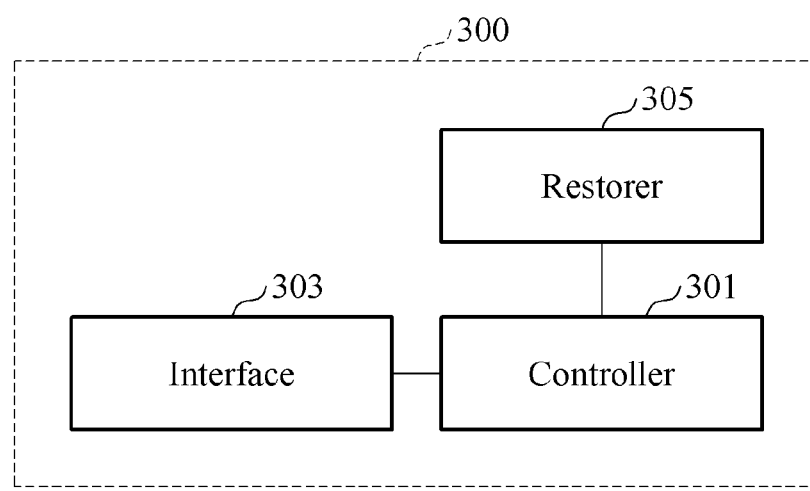
FIG. 3 is a block diagram illustrating a configuration of a cooperative transmission supporting apparatus according to an example embodiment.

FIG. 3 is a block diagram illustrating a configuration of a cooperative transmission supporting apparatus according to an example embodiment.

Referring to FIG. 3, a cooperative transmission supporting apparatus 300 may include a controller 301, an interface 303, and a restorer 305.

The controller 301 may receive channel states between a source terminal and a plurality of relay terminals from the source terminal, and determine detection bits with respect to the plurality of relay terminals based on the channel states. The controller 301 may transmit a relay instruction including the detection bits and ID information of the source terminal to the plurality of relay terminals. Here, the plurality of relay terminals may include, for example, a first relay terminal and a second relay terminal.

The relay terminals may detect sub-data corresponding to the detection bits from the data in response to the source terminal transmitting the data after the relay terminals are synchronized with the source terminal.

The data include a basic bit having a relatively low transmission error rate and an additional bit having a relatively high transmission error rate.

For example, in a case in which a channel state between the source terminal and the first relay terminal is relatively satisfactory when compared to a channel state between the source terminal and the second relay terminal, the controller 301 may determine the additional bit as a detection bit with respect to the first relay terminal. Further, the controller 301 may determine the basic bit as a detection bit with respect to the second relay terminal.

When determining the detection bits, the controller 301 may determine a bit position range differently as the detection bits with respect to the plurality of relay terminals. For example, the controller 301 may determine 3 to 4 bits as the detection bit with respect to the first relay terminal, and determine 1 to 2 bits as the detection bit with respect to the second relay terminal.

In another example, the controller 301 may determine the detection bits with respect to the plurality of relay terminals by relatively increasing sizes of the detection bits in proportion to the respective channel states between the source terminal and the plurality of relay terminals. That is, the controller 301 may determine a detection bit of more bits with respect to a relay terminal with a more satisfactory channel state.

In still another example, the controller 301 may select a set number of relay terminals, for example, two relay terminals, from the plurality of relay terminals based on at least one of the channel states between the source terminal and the plurality of relay terminals or distances between the source terminal and the plurality of relay terminals, and determine detection bits with respect to the selected relay terminals. That is, the controller 301 may select a relay terminal further based on the distances between the source terminal and the plurality of relay terminals, in addition to the channel states between the source terminal and the plurality of relay terminals.

Meanwhile, in a case in which a difference between the channel states is less than or equal to a set value or each channel state is greater than or equal to a reference channel state, the controller 301 may determine a detection bit with respect to one of the plurality of relay terminals as all bits in the data. In this example, the controller 301 may select a relay terminal closest to the source terminal from the plurality of relay terminals, and determine a detection bit with respect to the selected relay terminal as all the bits in the data. That is, in a case in which the plurality of relay terminals have similar channel states or the channel states satisfy set conditions, the controller 301 may determine a detection bit of one of the relay terminals as all bits in the data, thereby receiving the data transmitted from the source data through the one relay terminal.

The interface 303 may receive the sub-data from the relay terminals, respectively, in response to the relay terminals detecting the sub-data.

The interface 303 may further receive the data from the source terminal. That is, the interface 303 may receive the data transmitted from the source terminal via the plurality of relay terminals, and also receive the data directly from the source terminal.

The restorer 305 may restore the data by combining the received sub-data. For example, when the basic bit in the data is received as sub-data from the second relay terminal and the additional bit in the data is received as sub-data from the first relay terminal, the restorer 305 may combine the data by disposing the basic bit in front and the additional bit in rear.

The restorer 305 may obtain a diversity gain based on the data received in duplicate through cooperative transmission by adding up the data restored by combining the sub-data and the data received from the source terminal. That is, the restorer 305 may achieve an effect of receiving the same signal two times and considerably decrease a reception error rate by adding up the data.

Figure 4:
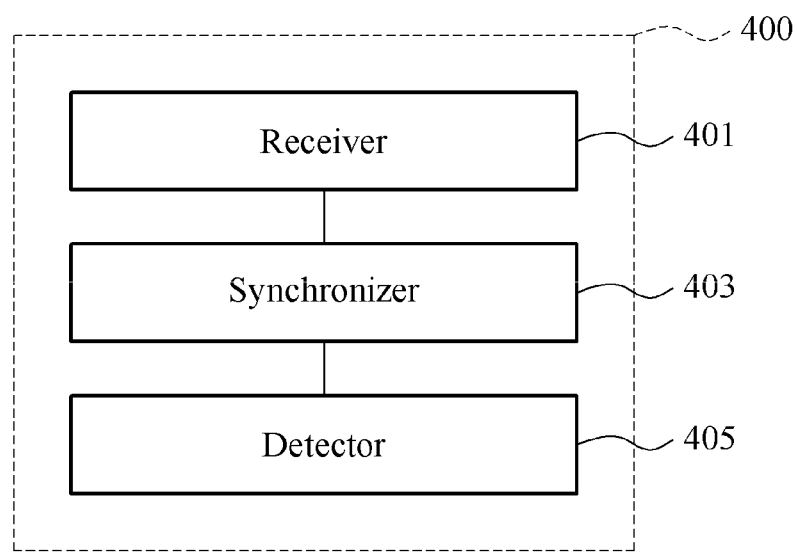
FIG. 4 is a block diagram illustrating a configuration of a relay terminal communicating with a cooperative transmission supporting apparatus according to an example embodiment.

FIG. 4 is a block diagram illustrating a configuration of a relay terminal communicating with a cooperative transmission supporting apparatus according to an example embodiment.

Referring to FIG. 4, a relay terminal 400 may include a receiver 401, a synchronizer 403, and a detector 405.

The receiver 401 may receive a relay instruction including a detection bit with respect to the relay terminal 400 and ID information of a source terminal from a cooperative transmission supporting apparatus, and extract the detection bit and the ID information of the source terminal from the relay instruction.

The synchronizer 403 may perform synchronization with the source terminal corresponding to the ID information.

The detector 405 may detect sub-data corresponding to the detection bit from data when the data is received from the synchronized source terminal, and transmit the sub-data to the cooperative transmission supporting apparatus. In this example, the sub-data may be transmitted using signals of the same power in all directions, for example, through an isotropic antenna.

Figure 5:
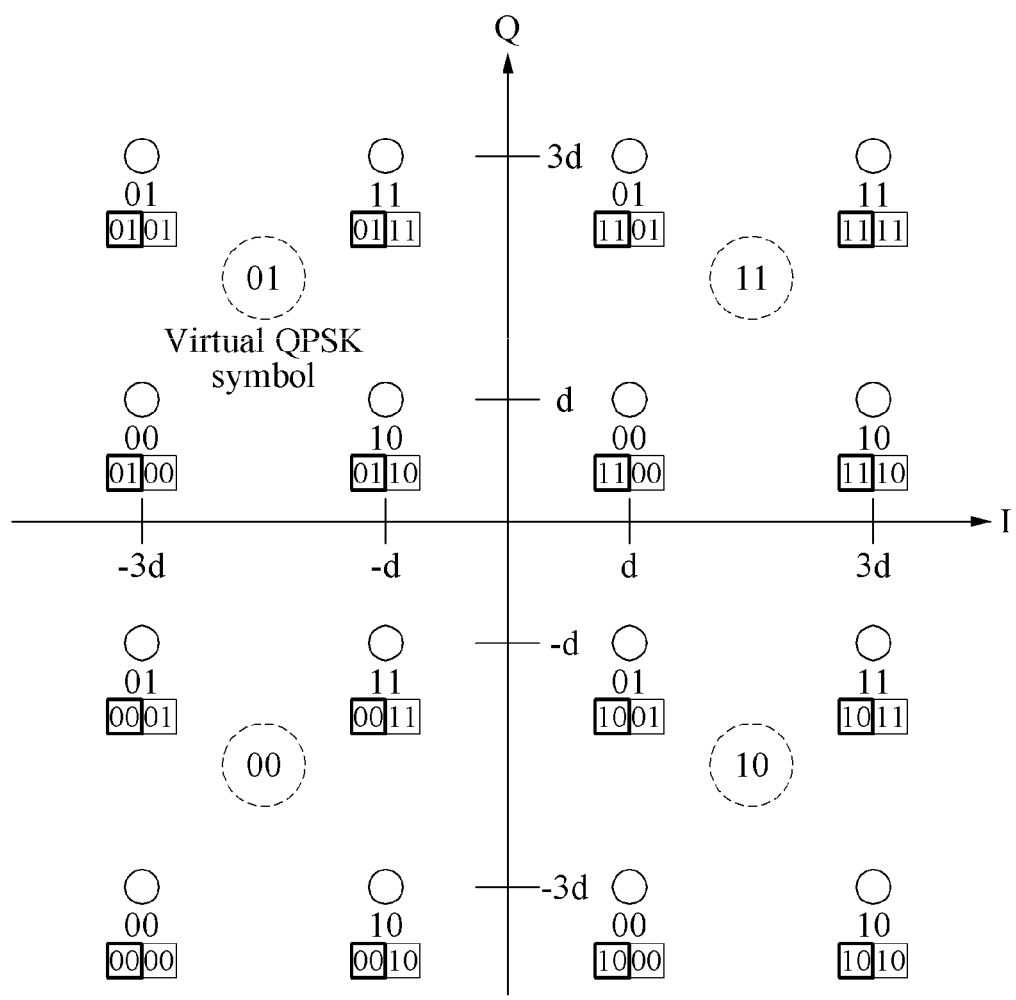
FIG. 5 illustrates an example of data received by a cooperative transmission supporting apparatus according to an example embodiment.

FIG. 5 illustrates an example of data received by a cooperative transmission supporting apparatus according to an example embodiment.

Referring to FIG. 5, data may be applied to a quadriphase phase-shift keying (QPSK) based rectangular 16-quadrature amplitude modulation (QAM) structure.

The data may be hierarchically modulated data, and include a basic bit and an additional bit. The basic bit denotes a position of quadrant, and may have a relatively high transmission error rate when compared to the additional bit. Further, the additional bit denotes a position of a final symbol in a determined quadrant, and may have a relatively low transmission error rate when compared to the basic bit.

Thus, the additional bit may be transmitted through a relay terminal having a relatively satisfactory channel state, when compared to the basic bit.

The data may be, for example, four bits, and include two basic bits positioned in front and two additional bits positioned in rear. For example, in a case in which the data is "0111", the first two bits "01" may be a basic bit denoting a first quadrant, and the last two bits "11" may be an additional bit denoting a position of a final symbol in the first quadrant.

Figure 6:
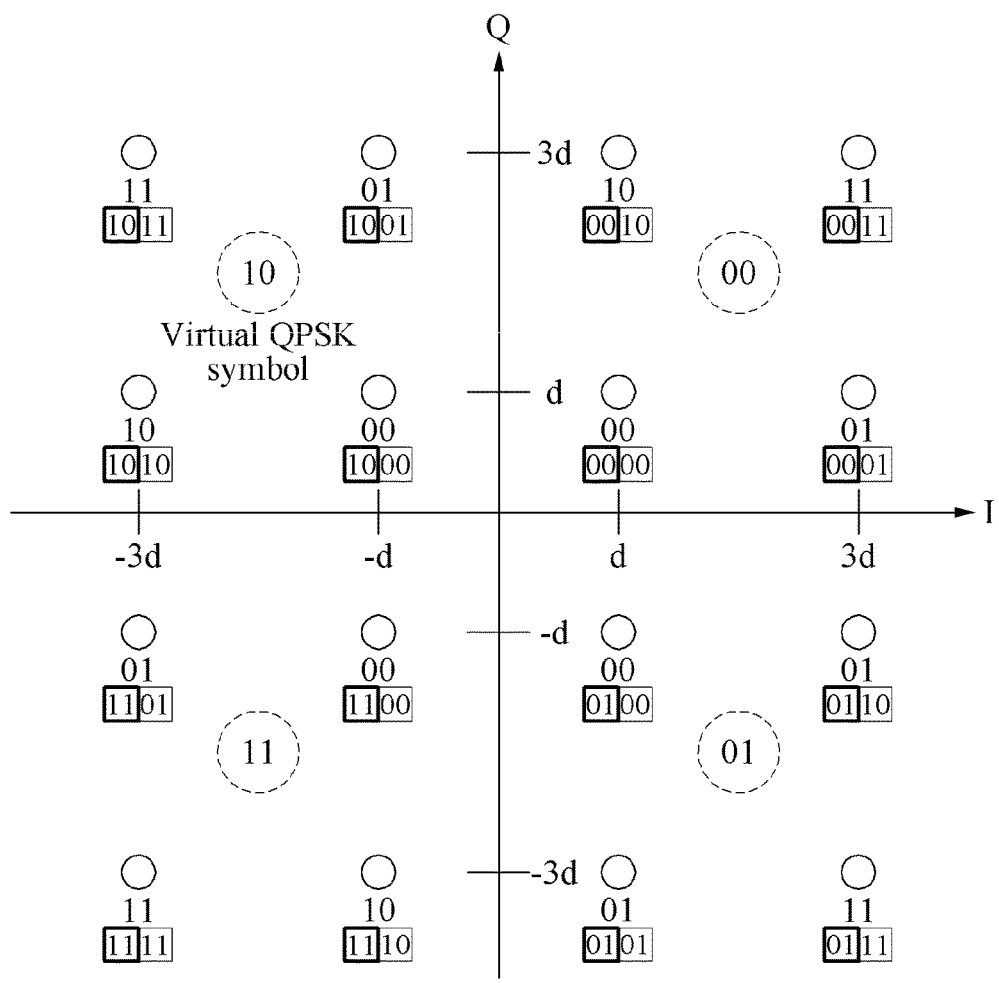
FIG. 6 illustrates an example of data received by a cooperative transmission supporting apparatus according to an example embodiment.

Further, the data may also be applicable to, for example, a gray code based 16-QAM structure, which is in a form as shown in FIG. 6.

Figure 7:
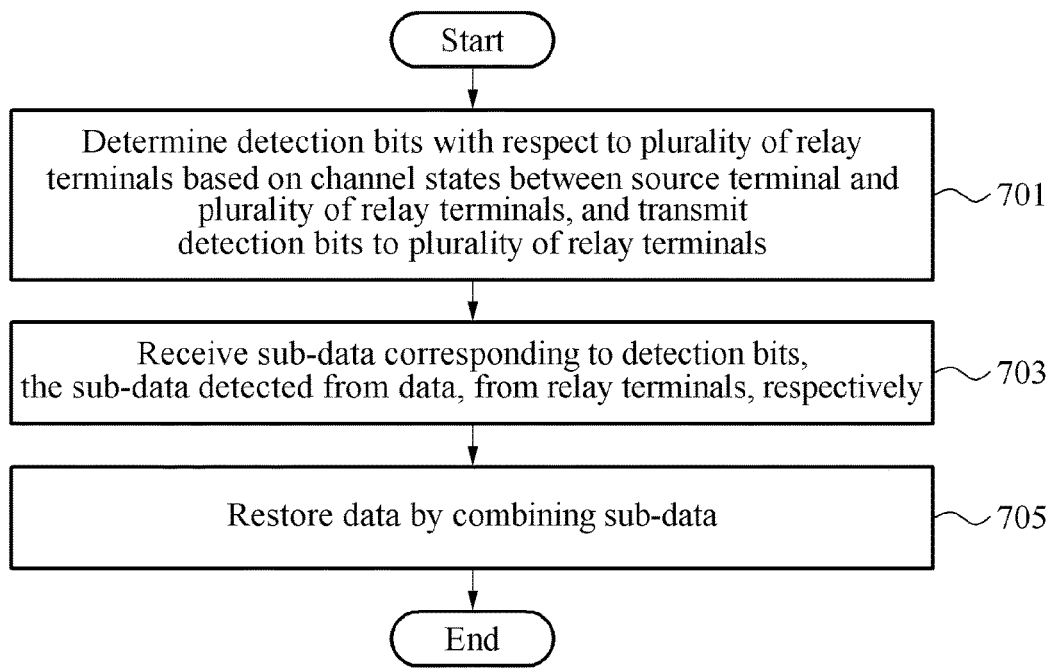
FIG. 7 is a flowchart illustrating a cooperative transmission supporting method according to an example embodiment.

FIG. 7 is a flowchart illustrating a cooperative transmission supporting method according to an example embodiment.

Referring to FIG. 7, in operation 701, a cooperative transmission supporting apparatus may determine detection bits with respect to a plurality of relay terminals based on channel states between a source terminal and the plurality of relay terminals, and transmit the detection bits to the plurality of relay terminals. In this example, the cooperative transmission supporting apparatus may receive the channel states between the source terminal and the plurality of relay terminals from the source terminal.

The cooperative transmission supporting apparatus may transmit, to the plurality of relay terminals, a relay instruction including the detection bits and ID information of the source terminal. Here, the plurality of relay terminals may include, for example, a first relay terminal and a second relay terminal.

In a case in which a channel state between the source terminal and the first relay terminal is relatively satisfactory when compared to a channel state between the source terminal and the second relay terminal, the cooperative transmission supporting apparatus may determine an additional bit in data as a detection bit with respect to the first relay terminal, and determine a basic bit in the data as a detection bit with respect to the second relay terminal.

Here, the basic bit may have a relatively low transmission error rate when compared to the additional bit, and the additional bit may have a relatively high transmission error rate when compared to the basic bit.

When determining the detection bits, the cooperative transmission supporting apparatus may determine the detection bits with respect to the plurality of relay terminals by relatively increasing sizes of the detection bits in proportion to the respective channel states between the source terminal and the plurality of relay terminals.

In another example, the cooperative transmission supporting apparatus may determine a bit position range differently as the detection bits with respect to the plurality of relay terminals.

In still another example, the cooperative transmission supporting apparatus may select a set number of relay terminals, for example, two relay terminals, from the plurality of relay terminals based on at least one of the channel states between the source terminal and the plurality of relay terminals or distances between the source terminal and the plurality of relay terminals, and determine detection bits with respect to the selected relay terminals.

Meanwhile, in a case in which a difference between the channel states is less than or equal to a set value or each channel state is greater than or equal to a reference channel state, the cooperative transmission supporting apparatus may determine a detection bit with respect to one of the plurality of relay terminals as all bits in the data. In this example, the cooperative transmission supporting apparatus may select a relay terminal closest to the source terminal from the plurality of relay terminals, and determine a detection bit with respect to the selected relay terminal as all the bits in the data.

In operation 703, the cooperative transmission supporting apparatus may receive sub-data corresponding to the detection bits, the sub-data detected from the data, from the relay terminals, respectively. In detail, the cooperative transmission supporting apparatus may receive sub-data from the relay terminals, respectively, in response to the individual relay terminals detecting the sub-data corresponding to the detection bits from the data when the source terminal transmits the data to each of the plurality of relay terminals.

The cooperative transmission supporting apparatus may further receive the data from the source terminal.

In operation 705, the cooperative transmission supporting apparatus may restore the data by combining the sub-data.

For example, when the basic bit is received as sub-data from the second relay terminal and the additional bit is received as sub-data from the first relay terminal, the cooperative transmission supporting apparatus may combine the data by disposing the basic bit in front and the additional bit in rear.

Then, the cooperative transmission supporting apparatus may obtain a diversity gain based on the data received in duplicate through cooperative transmission by adding up the data restored by combining the sub-data and the data received from the source terminal.

According to an example embodiment, by determining detection bits with respect to a plurality of relay terminals based on channel states between a source terminal and the plurality of relay terminals, and restoring data by receiving, from the plurality of relay terminals, and combining sub-data corresponding to the detection bits, the sub-data detected from the data in response to the source terminal transmitting the data, high-reliability data may be stably obtained through the plurality of relay terminals. Thus, by providing final data using the data received from the source terminal and the data stably received from the plurality of relay terminals, high-reliability cooperative transmission may be supported.

According to an example embodiment, by determining an additional bit with a relatively high transmission error rate as a detection bit with respect to a first relay terminal having a relatively satisfactory channel state, determining a basic bit with a relatively low transmission error rate as a detection bit with respect to a second relay terminal having a relatively poor channel state, among a plurality of relay terminals, and transmitting the additional bit and the basic bit to the first and second relay terminals such that the first and second relay terminals may stably detect the additional bit and the basic bit in data transmitted from a source terminal, the normal additional bit and basic bit without a transmission error may be received from the first and second relay terminals, without being affected by channel environments.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for supporting cooperative transmission, the apparatus comprising:
   a controller configured to determine detection bits received from a plurality of relay terminals based on channel states between a source terminal and the plurality of relay terminals, the relay terminals configured to detect sub-data corresponding to the detection bits from data comprising a sequence of bits when the data is transmitted from a source terminal;
   an interface configured to receive the sub-data from the relay terminals, respectively; and
   a restorer configured to restore the data by combining the received sub-data,
   wherein the plurality of relay terminals includes a first relay terminal and a second relay terminal, and
   the controller is configured to determine an additional bit having a relatively low transmission error rate as a detection bit with respect to the first relay terminal, and determine a basic bit having a relatively high transmission error rate as a detection bit with respect to the second relay terminal.

2. The apparatus of claim 1, wherein the sequence of bits includes the basic bit associated with a first area of a quadrature and the additional bit associated with a second area of the quadrature that is smaller than the first area of the quadrature, and
   the controller is configured to determine the additional bit as a detection bit with respect to the first relay terminal having a more satisfactory channel state with the source terminal compared to a channel state between the source terminal and the second relay terminal, and determine the basic bit as a detection bit with respect to the second relay terminal.

3. The apparatus of claim 1, wherein, when the basic bit is received as sub-data from the second relay terminal and the additional bit is received as sub-data from the first relay terminal, the restorer is configured to combine the data by sequentially arranging the basic bit in front of the additional bit.

4. The apparatus of claim 1, wherein the controller is configured to determine a bit position range differently as the detection bits with respect to the plurality of relay terminals.

5. The apparatus of claim 1, wherein, in a case in which a difference between the channel states is less than or equal to a set value or each channel state is greater than or equal to a reference channel state, the controller is configured to determine a detection bit with respect to one of the plurality of relay terminals as all bits in the data.

6. The apparatus of claim 5, wherein the controller is configured to select a relay terminal closest to the source terminal from the plurality of relay terminals, and determine a detection bit with respect to the selected relay terminal as all the bits in the data.

7. The apparatus of claim 1, wherein the controller is configured to increase the number of detection bits in the sequence of bits when the channel state of an associated relay increases.

8. The apparatus of claim 1, wherein the controller is configured to select a set number of relay terminals from the plurality of relay terminals based on at least one of the channel states between the source terminal and the plurality of relay terminals or distances between the source terminal and the plurality of relay terminals, and determine detection bits with respect to the selected relay terminals.

9. A method of supporting cooperative transmission, the method comprising:
    determining detection bits with respect to a plurality of relay terminals based on channel states between a source terminal and the plurality of relay terminals;
    receiving sub-data from the relay terminals, respectively, in response to the individual relay terminals detecting the sub-data corresponding to the detection bits from data comprising a sequence of bits when a source terminal transmits the data to each of the plurality of relay terminals; and
    restoring the data by combining the received sub-data,
    wherein the plurality of relay terminals includes a first relay terminal and a second relay terminal, and
    the determining comprises determining an additional bit having a relatively low transmission error rate as a detection bit with respect to the first relay terminal, and determine a basic bit having a relatively high a transmission error rate as a detection bit with respect to the second relay terminal.

10. The method of claim 9, wherein the sequence of bits includes the basic bit associated with a first area of a quadrature and the additional bit associated with a second area of the quadrature that is smaller than the first area of the quadrature, and
    the determining comprises determining the additional bit as a detection bit with respect to the first relay terminal having a more satisfactory channel state with the source terminal compared to a channel state between the source terminal and the second relay terminal, and determine the basic bit as a detection bit with respect to the second relay terminal.

11. The method of claim 9, wherein the restoring comprises, when the basic bit is received as sub-data from the second relay terminal and the additional bit is received as sub-data from the first relay terminal, combining the data by sequentially arranging the basic bit in front of the additional bit.

12. The method of claim 9, wherein the determining comprises determining a bit position range differently as the detection bits with respect to the plurality of relay terminals.

13. The method of claim 9, wherein the determining comprises, in a case in which a difference between the channel states is less than or equal to a set value or each channel state is greater than or equal to a reference channel state, determining a detection bit with respect to one of the plurality of relay terminals as all bits in the data.

14. The method of claim 13, wherein the determining comprises selecting a relay terminal closest to the source terminal from the plurality of relay terminals, and determining a detection bit with respect to the selected relay terminal as all the bits in the data.

15. The method of claim 9, wherein the determining comprises increasing the number of detection bits in the bit word when the channel state of an associated relay increases.

16. The method of claim 9, wherein the determining comprises:
    selecting a set number of relay terminals from the plurality of relay terminals based on at least one of the channel states between the source terminal and the plurality of relay terminals or distances between the source terminal and the plurality of relay terminals; and
    determining detection bits with respect to the selected relay terminals.

* * * * *